United States Patent [19]
Lee et al.

[11] Patent Number: 5,887,022
[45] Date of Patent: Mar. 23, 1999

[54] PEER-PEER FREQUENCY HOPPING SPREAD SPECTRUM WIRELESS SYSTEM

[75] Inventors: Wilson Lee, Whitehorse; Michael Fattouche, Alberta, both of Canada

[73] Assignee: Telecommunications Research Laboratories, Edmonton, Canada

[21] Appl. No.: 662,155

[22] Filed: Jun. 12, 1996

[51] Int. Cl.$^6$ .............................. H04B 15/00; H04K 1/00; H04L 27/30
[52] U.S. Cl. ............................ 375/202; 375/200; 370/330
[58] Field of Search ..................... 370/522, 524, 370/280, 330; 375/202, 200

[56] References Cited

U.S. PATENT DOCUMENTS

| | | | |
|---|---|---|---|
| 4,554,668 | 11/1985 | Deman | 375/1 |
| 5,111,478 | 5/1992 | McDonald | 375/200 |
| 5,142,534 | 8/1992 | Simpson | 370/95 |
| 5,229,995 | 7/1993 | Strawczynski et al. | 370/524 |
| 5,274,666 | 12/1993 | Dowell et al. | 375/200 |
| 5,537,434 | 7/1996 | Persson et al. | 375/202 |
| 5,570,352 | 10/1996 | Poyhonen | 375/202 |

OTHER PUBLICATIONS

A Design Concept for Reliable Mobile Radio Networks with Frequency Hopping Signaling, by Anthony Ephremides, Jeffrey E. Wieselthier, Dennis J. Baker, Proceedings of the IEEE, vol. 75, No. 1, pp. 56–73, Jan. 1987.

A Distributed Control Scheme in Multi–hop Packet Radio Networks for Voice/Data Traffic Support, Chun–hung Richard Lin, Mario Gerla, Proceedings of ICC '95, vol. 2, pp. 1238–1242, Jun. 1995.

Abstract of U.S. Patent 5,430,759, Yokev, et al, issued Jul. 4, 1995, 5 pages.

Abstract of U.S. Patent 5,425,051, Mahany, issued Jun. 13, 1995, 2 pages.

Abstract of U.S. Patent 5,386,435, Cooper, et al, issued Jan. 31, 1995, 2 pages.

Abstract of U.S. Patent 5,287,384, Avery, et al, issued Feb. 15, 1994, 2 pages.

Abstract of U.S. Patent 5,166,953, Hershey, et al. issued Nov. 24, 1992, 2 pages.

*Primary Examiner*—Chi H. Pham
*Assistant Examiner*—Emmanuel Bayard
*Attorney, Agent, or Firm*—Anthony R. Lambert

[57] ABSTRACT

A peer—peer frequency hopping spread spectrum wireless system allows the implementation of full duplex voice/data communications in a single hop peer—peer wireless system. The system uses frequency hopping spread spectrum technique. The frequency band is divided into signalling and message channels. The signalling channels use TDMA with a media access control(MAC) protocol developed for the wireless terminals to access the signalling channels. Once a wireless terminal accesses a time slot on a signalling channel, the corresponding hopping pattern on the message channel is assigned. The message channels use frequency hopping. The hopping patterns of the message channel are chosen such that there is no co-channel interference and minimum adjacent channel interference in the system. Either analog or digital modulation schemes can be used. Synchronization of a transmitter-receiver pair (user-pair) and among user-pairs are achieved through the use of the signalling channels.

13 Claims, 13 Drawing Sheets

HOPPING
PATTERNS

| | | | | | | | | |
|---|---|---|---|---|---|---|---|---|
| #1 | 1 | 2 | 3 | 4 | 5 | 6 | 7 | 8 |
| #2 | 3 | 4 | 5 | 6 | 7 | 8 | 1 | 2 |
| #3 | 5 | 6 | 7 | 8 | 1 | 2 | 3 | 4 |
| #4 | 7 | 8 | 1 | 2 | 3 | 4 | 5 | 6 |
| #5 | 2 | 3 | 8 | 1 | 6 | 7 | 4 | 5 |
| #6 | 4 | 5 | 2 | 3 | 8 | 1 | 6 | 7 |
| #7 | 6 | 7 | 4 | 5 | 2 | 3 | 8 | 1 |
| #8 | 8 | 1 | 6 | 7 | 4 | 5 | 2 | 3 |

TIME

PEER-PEER FREQUENCY HOPPING SPREAD SPECTRUM WIRELESS SYSTEM

FIELD OF THE INVENTION

The invention relates generally to wireless systems, and more particularly, to peer—peer wireless systems using frequency hopping spread spectrum.

BACKGROUND OF THE INVENTION

Wireless networks for voice/data communications using frequency hopping spread spectrum have been proposed (as described, for examples, in U.S. Pat. No. 5,142,534 and in U.S. Pat. No. 4,554,668). However, these proposed networks all require the use of at least one master station. They are not peer—peer networks.

A peer—peer wireless system using frequency hopping spread spectrum has been documented in the literature (see Anthony Ephremides, "A Design Concept for Reliable Mobile Radio Networks with Frequency Hopping Signalling", Proceedings of the IEEE, vol. 75, no. 1, pp. 56–73, January 1987). The system requires each node to constantly update the information of its neighbours and its neighbours' neighbours. Each user is also assigned its own transmitter-based code for point-to-point and broadcast traffic. Since such a system is designed for the U.S. Navy, the system must be able to resist a variety of jamming threats. Hence, a peer—peer wireless system with frequency hopping is used.

Another peer—peer wireless system—Wireless Adaptive Mobile Information System (WAMIS) using spread spectrum technique was proposed in the literature (see Chunhung Richard Lin, Mario Gerla, "A Distributed Control Scheme in Multi-hop Packet Radio Networks for Voice/Data Traffic Support", Proceedings of ICC '95, vol. 2, pp. 1238–1242, June 1995). Such a system is designed for emergency disaster relief and for the military use. System initialization is required with each node knowing its one-hop neighbours. Each user-pair is pre-assigned a spreading code for communication.

Both of the proposed peer—peer wireless systems require network initialization to establish the links among the nodes. The proposed peer—peer wireless system does not require any network initialization. Also, since the proposed peer—peer wireless system is designed for commercial use, jamming threat is not a concern. The peer—peer wireless system can then use a dedicated signalling channel or channels for transmitter-receiver synchronization and for broadcasting information of the channels usage. Frequency hopping spread spectrum is used to reduce multipath interference. The signalling channel is used to assign frequency hopping patterns to active user-pairs to avoid co-channel interference. This enables the assigned frequency band to be fully utilized. If the hopping patterns are chosen carefully, adjacent channel interference can be minimized.

SUMMARY OF THE INVENTION

In accordance with the present invention, a peer—peer wireless system is proposed for commercial use. In one aspect of the invention, no network initialization is required. The allocated frequency band for the system is divided into signalling and message channels. The signalling channels use time-division multiple access (TDMA) scheme with a media access control (MAC) protocol designed for the wireless terminals to access the signalling channels in which a search strategy is used to search for an idle time slot. Each time slot of a signalling channel corresponds to a message channel, which corresponds to a distinct hopping pattern. The message channels preferably, in one aspect of the invention, consist of N distinct hopping patterns chosen to eliminate the co-channel interference (or frequency hits) and to minimize the next adjacent channel interference in the system. Synchronization of a transmitter-receiver pair and among the user-pairs is achieved by the wireless terminal periodically frequency hopping into one of the signalling channels during transmission of message data. The hopping rate is chosen to avoid frequency hopping synchronization among the user-pairs. The system can use either analog or digital modulation scheme. If analog modulation is used, frequency division duplex scheme is required for a user-pair communication. If digital modulation is used, either frequency division duplex or time division duplex scheme can be used for user-pair communication.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

In this patent document, the term "message data" or "message information" is used to describe both voice and non-voice data being transmitted between wireless terminals.

System Description

Figure 1:
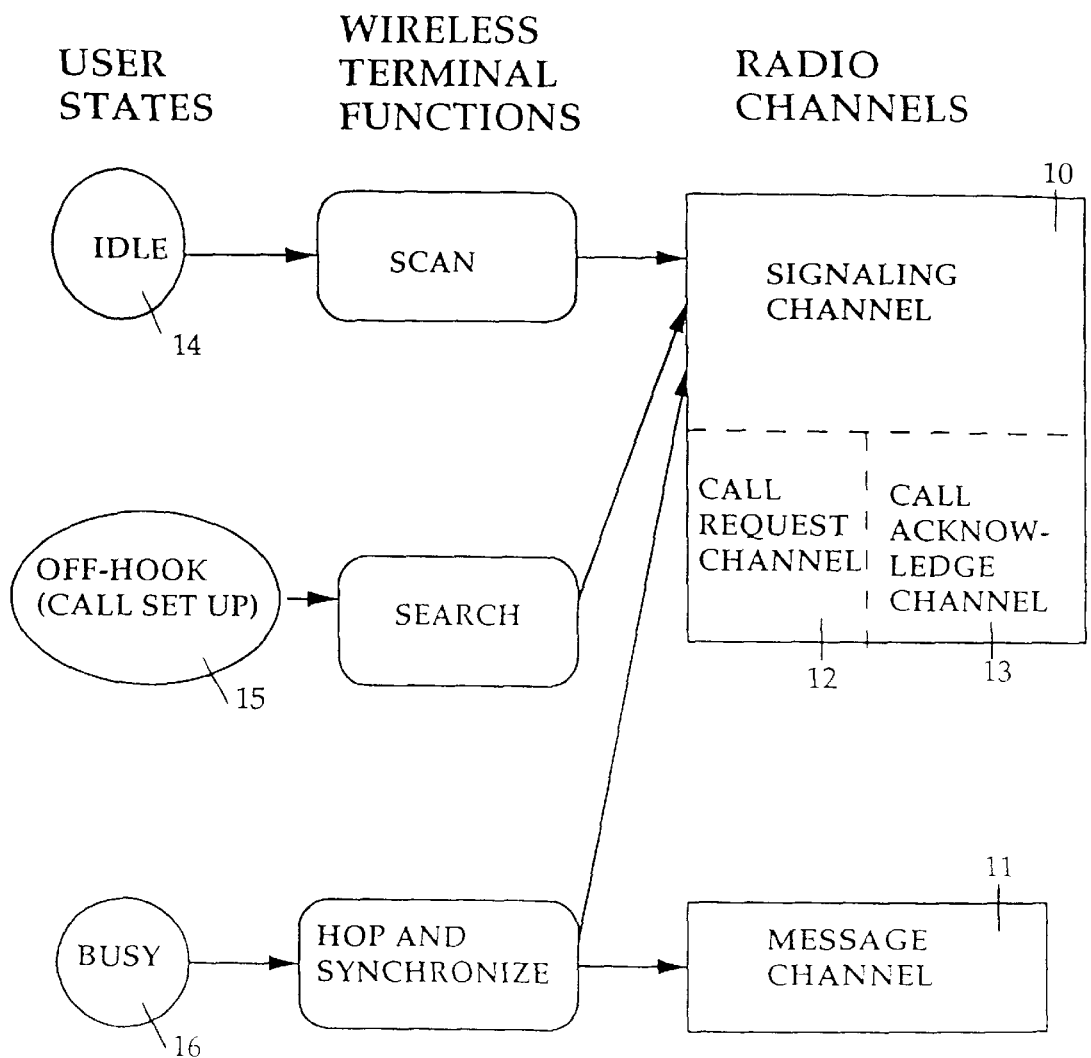
FIG. 1 shows the relationship among the user states, the wireless terminal functions, and the radio channels.

Referring to FIG. 1, the allocated frequency band is divided into at least one signalling channel 10 and message channels 11. More than one signalling channel may be used. In this description, we deal with the case of only one signalling channel but the invention is easily extended to use of more than one signalling channel. The signalling channel consists of two sub-channels: the Call Request channel 12 and the Call Acknowledge channel 13. Each signalling channel 10 is divided into time slots. The message channels consist of N distinct frequency slots with N different hopping patterns.

The relationship among the states of a wireless terminal, the wireless terminal functions, and the radio channels is shown in FIG. 1. At any time instance, a user is in one of the three states: idle state 14, off-hook state 15, or busy state 16. In the idle state, the wireless terminal scans the Call Request channel to determine if any other user is calling. In the off-hook state, the wireless terminal searches for a time slot on the Call Request channel for call set up. In the busy state, the wireless terminal hops in the message channel frequency slots for information exchange with another wireless terminal and periodically hops into the Call Request channel for synchronization of the transmitter-receiver pair (user-pair). A call is initiated by a wireless terminal accessing an idle time slot in the signalling channel, and subsequently transmitting message data in the message channel using a distinct frequency hopping pattern that is assigned to that wireless terminal and that corresponds to the time slot accessed by the wireless terminal.

Figure 2:
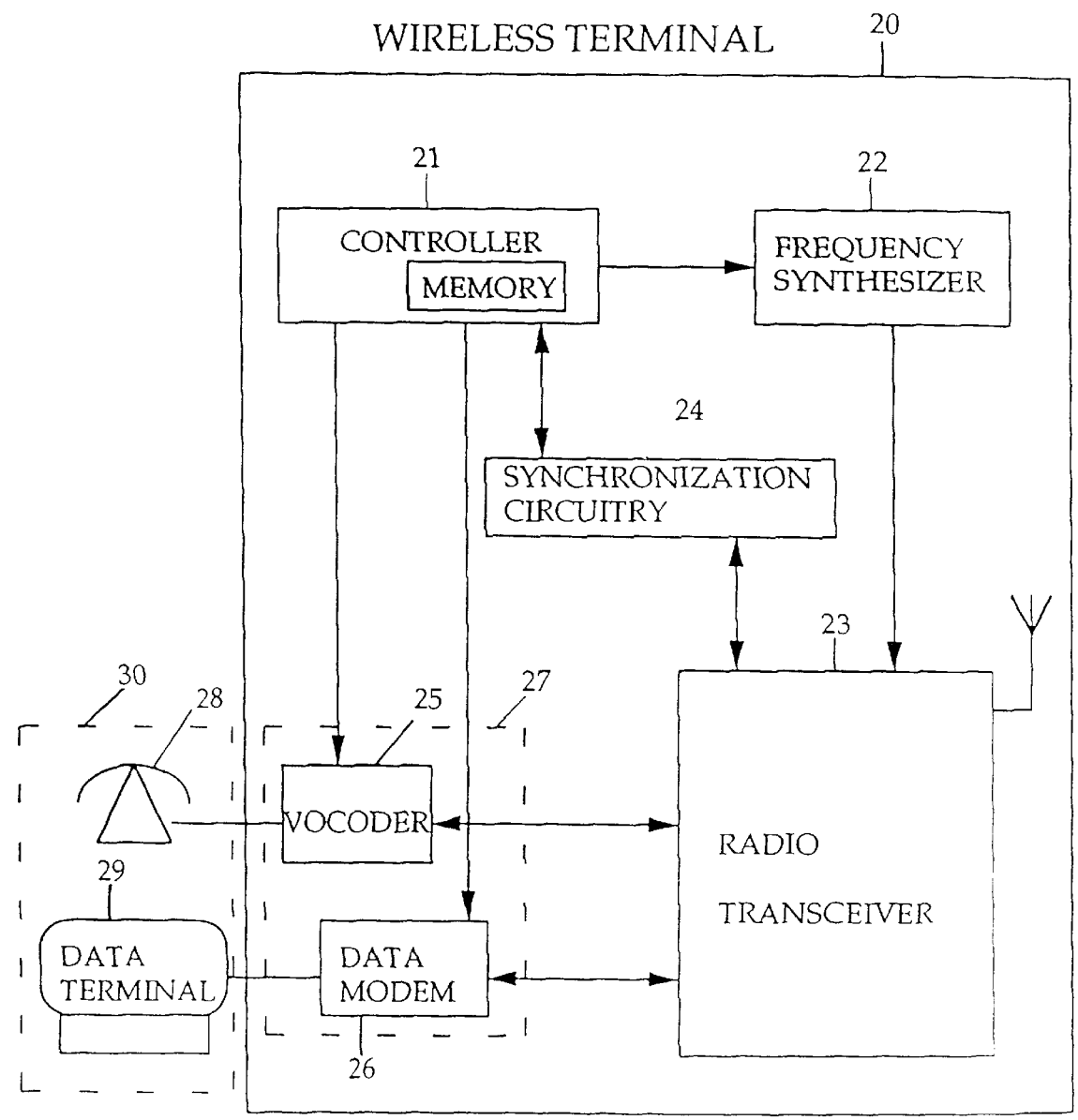
FIG. 2 shows a block diagram of the wireless terminal.

A block diagram of a wireless terminal 20 according to the invention is shown in FIG. 2. The wireless terminal 20 includes a radio transceiver 23, a frequency synthesizer 22 having output operatively coupled to the radio transceiver 23, a synchronizer 22 operatively coupled to the radio transceiver 23 for the exchange of synchronization information, a codec 27 operatively coupled to the radio transceiver 23 for the exchange, coding and decoding of message information between a source 30 of message information and the radio transceiver, and a controller 21 operatively coupled to the synchronizer 24 and the frequency synthesizer 22 for instructing the frequency synthesizer 22 to change the frequency on which the radio transceiver 23 operates.

The controller 21 performs scan and search functions by tuning to the signalling channel 10 using the frequency synthesizer 22. In the hop and synchronization mode, the controller 21 and the synchronization circuitry 24 are responsible for the synchronization of the transmitter-receiver pair (user-pair) and among the user-pairs. The codec 27 may be formed by a combination of vocoder 25 and a data modem 26 for converting message (voice/data) information into binary data to be modulated by the radio transceiver 23. The received signal from another wireless terminal 20 having the same or functionally similar design is demodulated by the radio transceiver 23 and converted to user message information by the vocoder 25 and data modem 26. The source 30 of message information may for example be a conventional telephone 28 or telephone-like device or a data terminal 29. The physical elements of the wireless terminal are each well known in the art in themselves, with the exception of the programming of the controller, which may be derived readily from this description.

The controller 21 instructs the frequency synthesizer 22 to:

(1) periodically hop in the message channel 11 according to a stored frequency hopping pattern uniquely corresponding to one of the time slots in the signalling channel 10;

(2) to periodically hop into the signalling channel 10 during exchange of message information on the message channel 11, while instructing the synchronizer 24 to provide synchronization information to the radio transceiver 23 during a hop by the frequency synthesizer 22 into the signalling channel 10; and (3) to scan the signalling channel to search for an idle time slot according to a search program, in which the search program contains instructions:
(a) if all time slots are idle, to cause the radio transceiver to transmit signals in any usable time slot;
(b) if one or more but not all time slots are busy, to search for a usable time slot adjacent to a busy time slot and to cause the radio transceiver to transmit signals in the usable time slot; and
(c) if all time slots are busy, to cause the wireless terminal to emit a busy tone to the wireless terminal or repeat the scan for an idle time slot.

Signalling Channel

As mentioned in the system section, the signalling channel 10 has two sub-channels: the Call Request channel 12 and the Call Acknowledgment channel 13.

Figure 3:
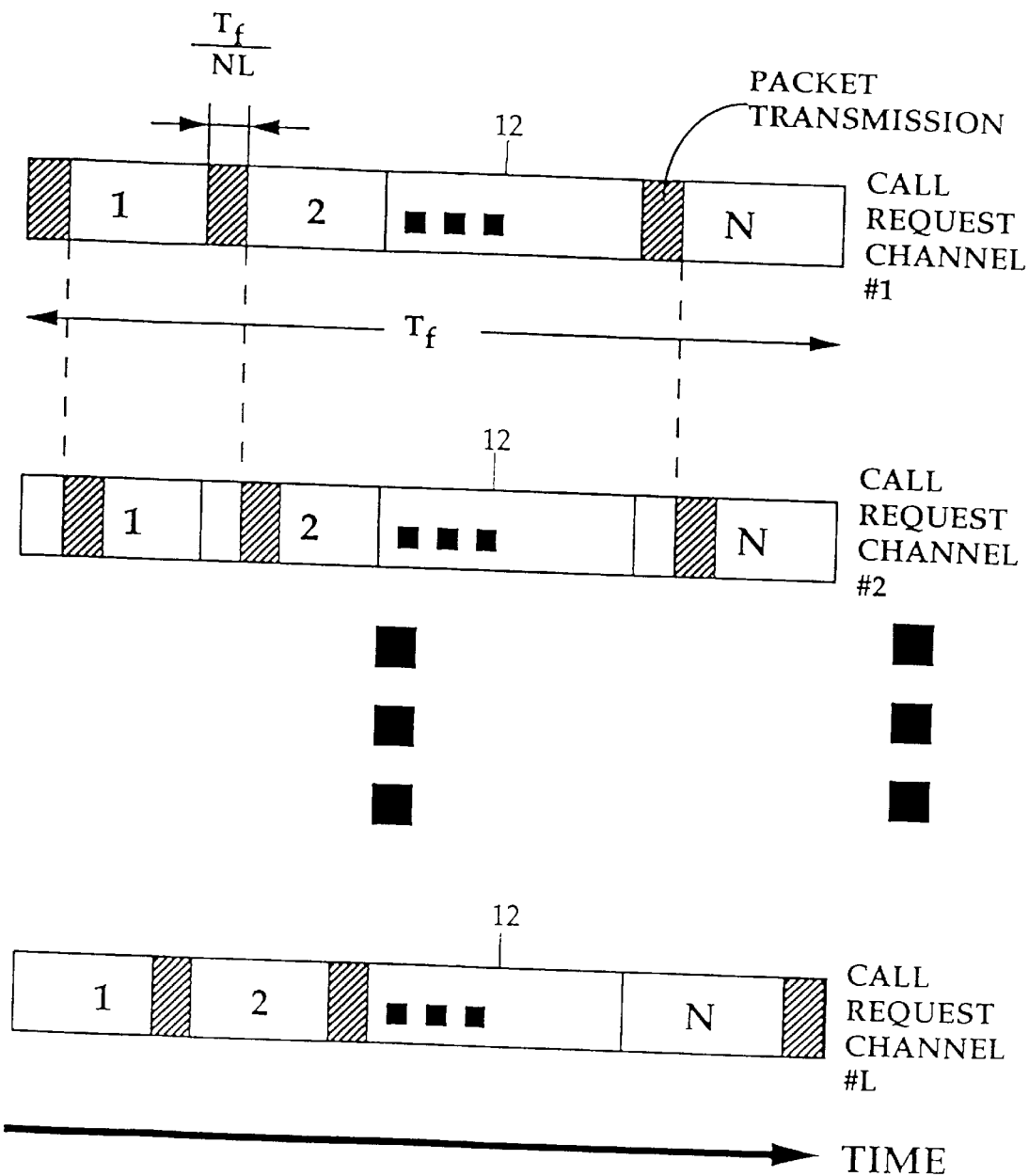
FIG. 3 shows the packet transmission duration on the Call Request channels using diversity of order L.
Figure 4:
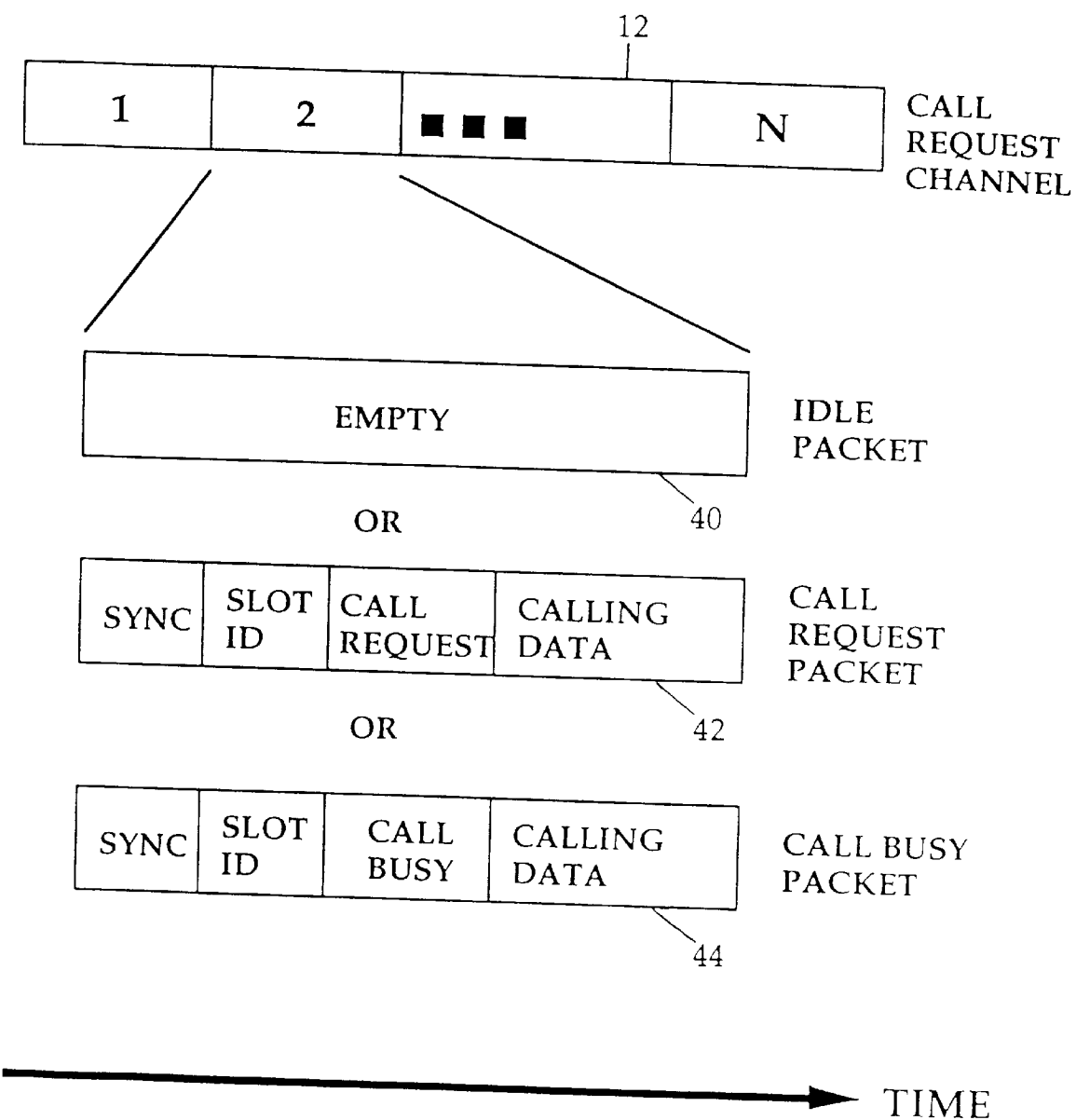
FIG. 4 shows the packet types on the Call Request channel.

The Call Request channel 12 uses a time-division multiple access (TDMA) scheme with N time slots per frame and with a frame time=$T_f$ seconds. Each time slot occupies $T_f/N$ seconds. If diversity of the Call Request channel of order L is used, then each time slot of the channel uses $T_f/N/L$ seconds for transmission, as shown in FIG. 3. The frequency separation of the Call Request channels 12 is chosen such that each channel fades independently. Each time slot on the Call Request channel 12 has one of three packets, as shown in FIG. 4: the idle packet 40 (empty slot), the call request packet 42, or the call busy packet 44. The call request packet 42 includes sync, slot identification, a call request code and calling data. The call busy packet 44 is the same but uses a call busy code. The idle packet 40 indicates that the time slot is unoccupied and can be used by any wireless terminal 20. The call request packet 42 indicates that the time slot is used for call set up between two wireless terminals 20. The call busy packet 44 indicates that the hopping pattern corresponding to the time slot is used by a user-pair (transmitter-receiver pair). It is also used for user-pair synchronization. The call busy packet 44 is sent on the Call Request channel 12 every $T_f$ seconds for the entire duration of the user-pair communication.

Figure 5:
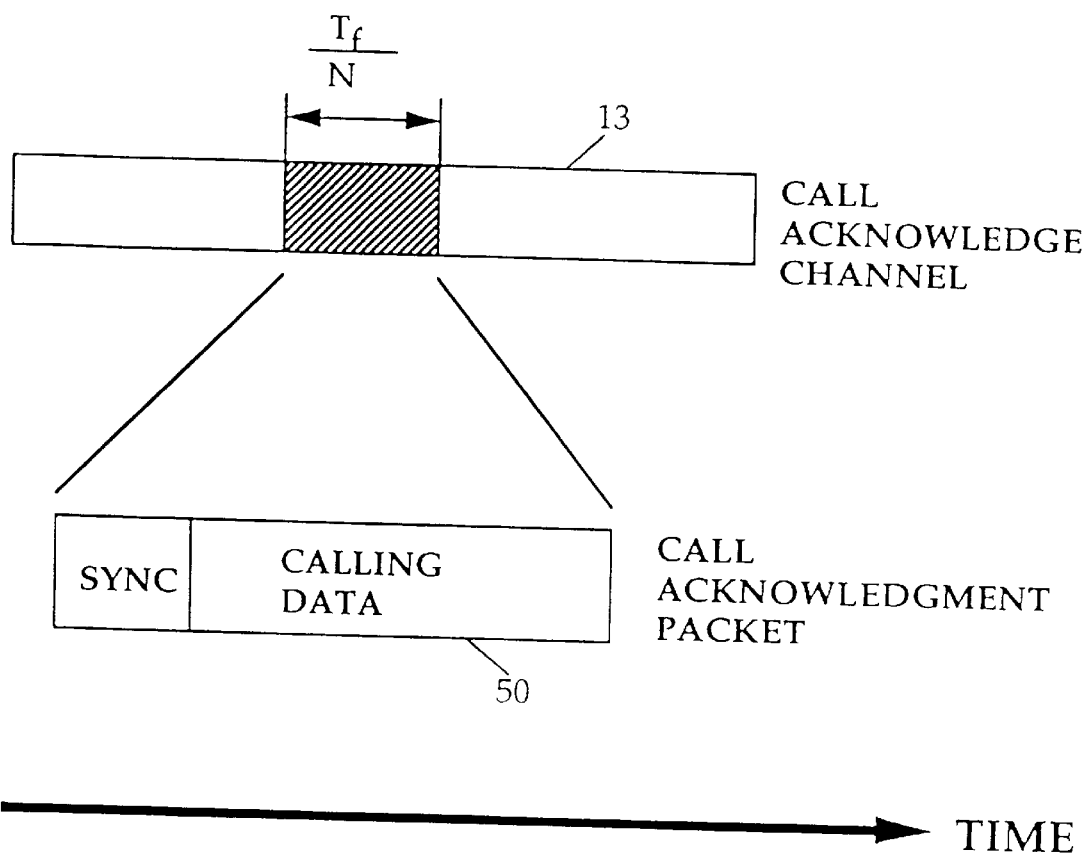
FIG. 5 shows the call acknowledgment packet on the Call Acknowledge channel.
Figure 6:
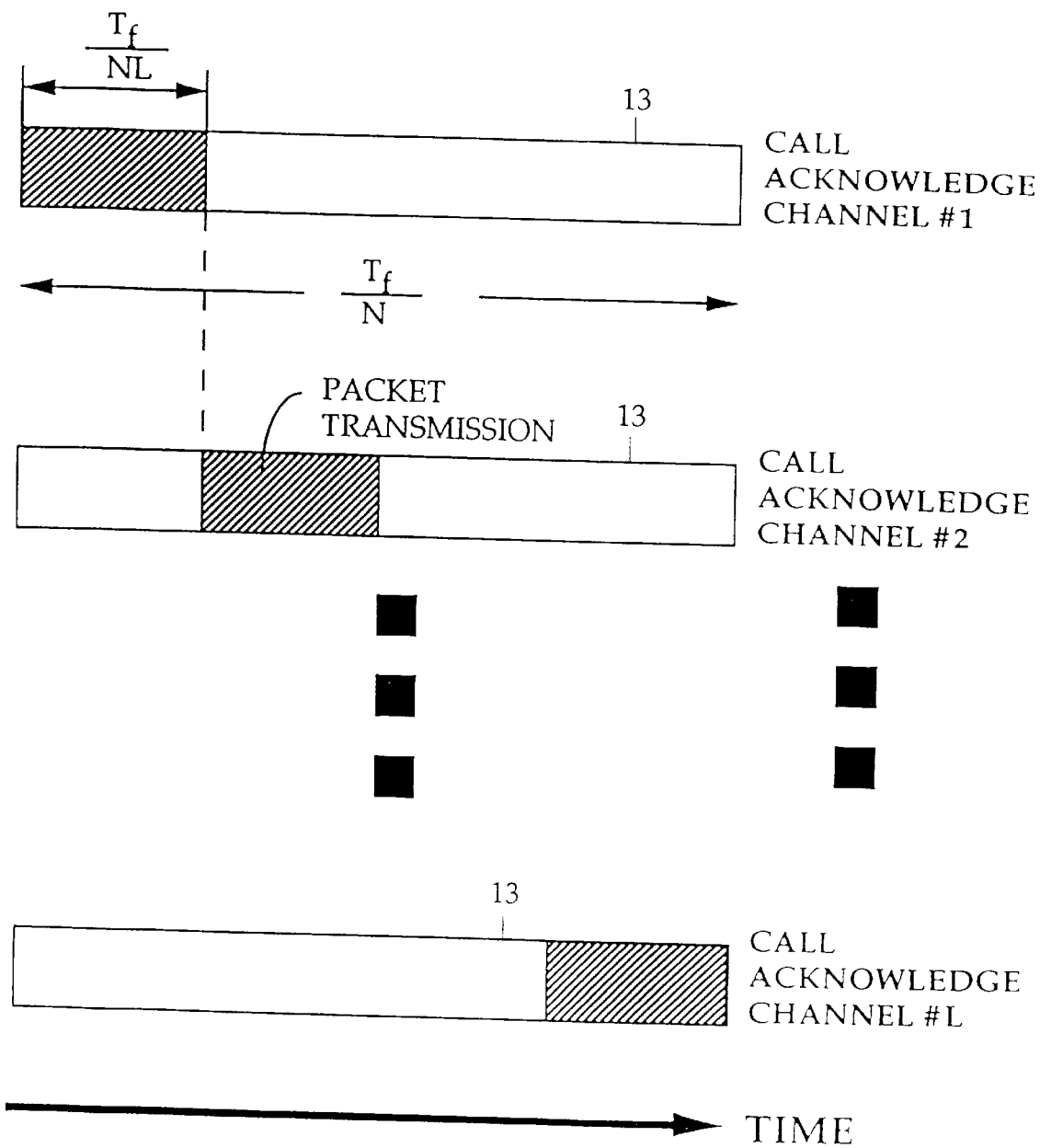
FIG. 6 shows the packet transmission duration on the Call Acknowledge channels using diversity of order L.

The Call Acknowledge channel 13 has no multiple access scheme. A call acknowledgment packet 50 is transmitted on this channel, as shown in FIG. 5, from the wireless terminal 20 after it has received a call request packet 42 on the Call Request channel 12. Each packet transmission on the Call Acknowledge channel 13 occupies $T_f/N$ seconds. If diversity of the Call Acknowledge channel of order L is used, then each packet transmission on a Call Acknowledge channel 13 occupies $T_f/N/L$ seconds, as shown in FIG. 6. The frequency separation of the Call Acknowledge channels 13 is chosen such that each channel fades independently.

Multiple Access Control Protocol

A media access control (MAC) protocol is designed to allow a wireless terminal 20 to access a time slot on the Call Request channel 12 when the user is in the off-hook state 15 a call is to be initiated. Again, without loss of generality, one Call Request channel 12 is assumed. The general rules of accessing a time slot are as follows:

(1) The wireless terminal 20 scans the Call Request channel 12 for a duration of $T_f$ seconds (one period), and then it has to determine which time slots have either call request packets 42 or call busy packets 44.

Figure 7:
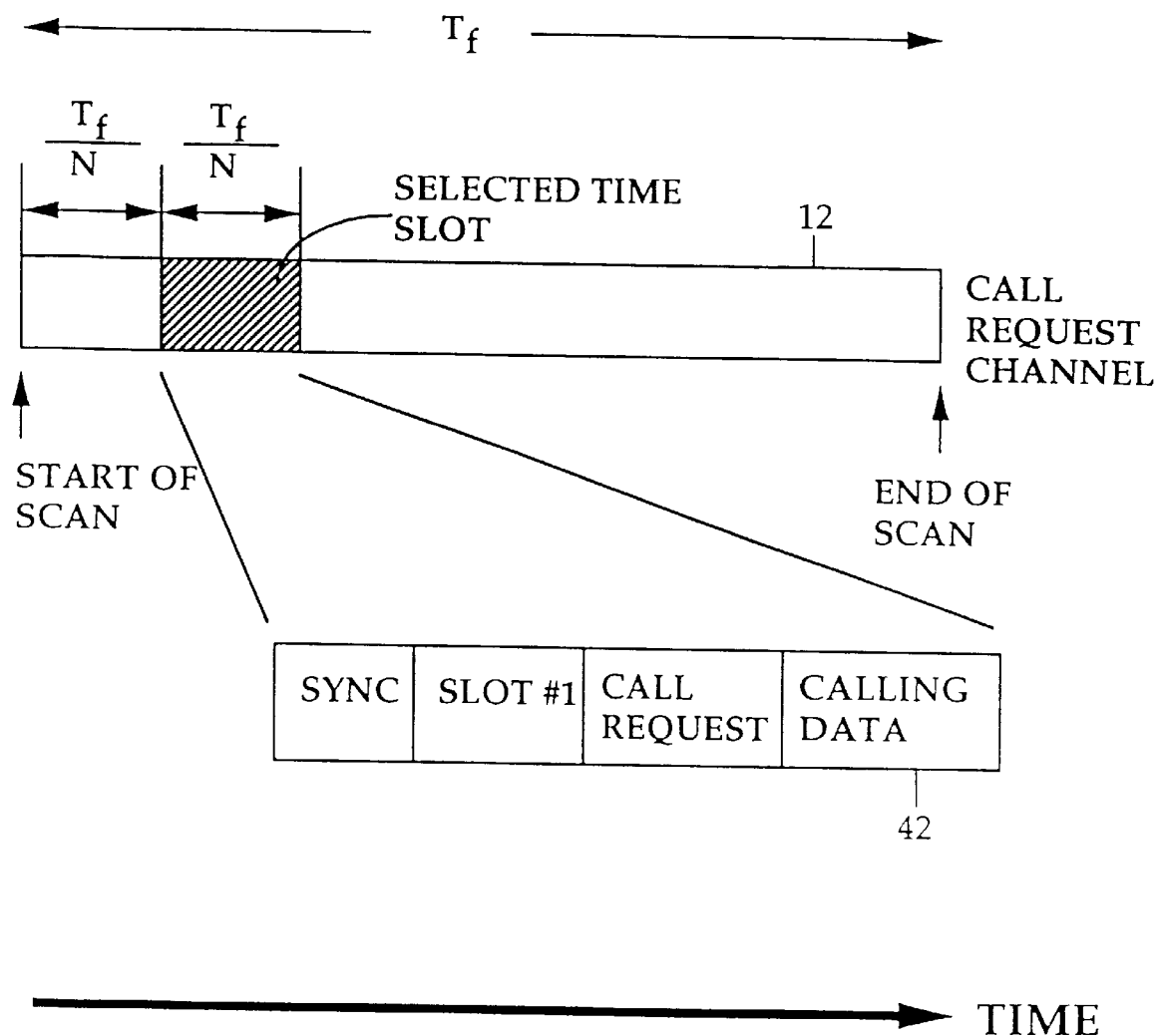
FIG. 7 shows the selected time slot of the wireless terminal on the Call Request channel when the channel is found to be empty.

(2) After scanning the Call Request channel 12, the wireless terminal will encounter three situations:
(2.1) The entire channel is empty. The wireless terminal preferably starts transmitting $T_f/N$ seconds from the start of the channel scan using slot ID#1, as shown in FIG. 7, but may access any other usable time slot.
(2.2) The channel has only one slot that is not idle with slot ID#k. Two different cases will occur:
(2.2.1) The used slot has at least $T_f/N$ seconds between the end of the slot and the end of the scan.

Figure 8:
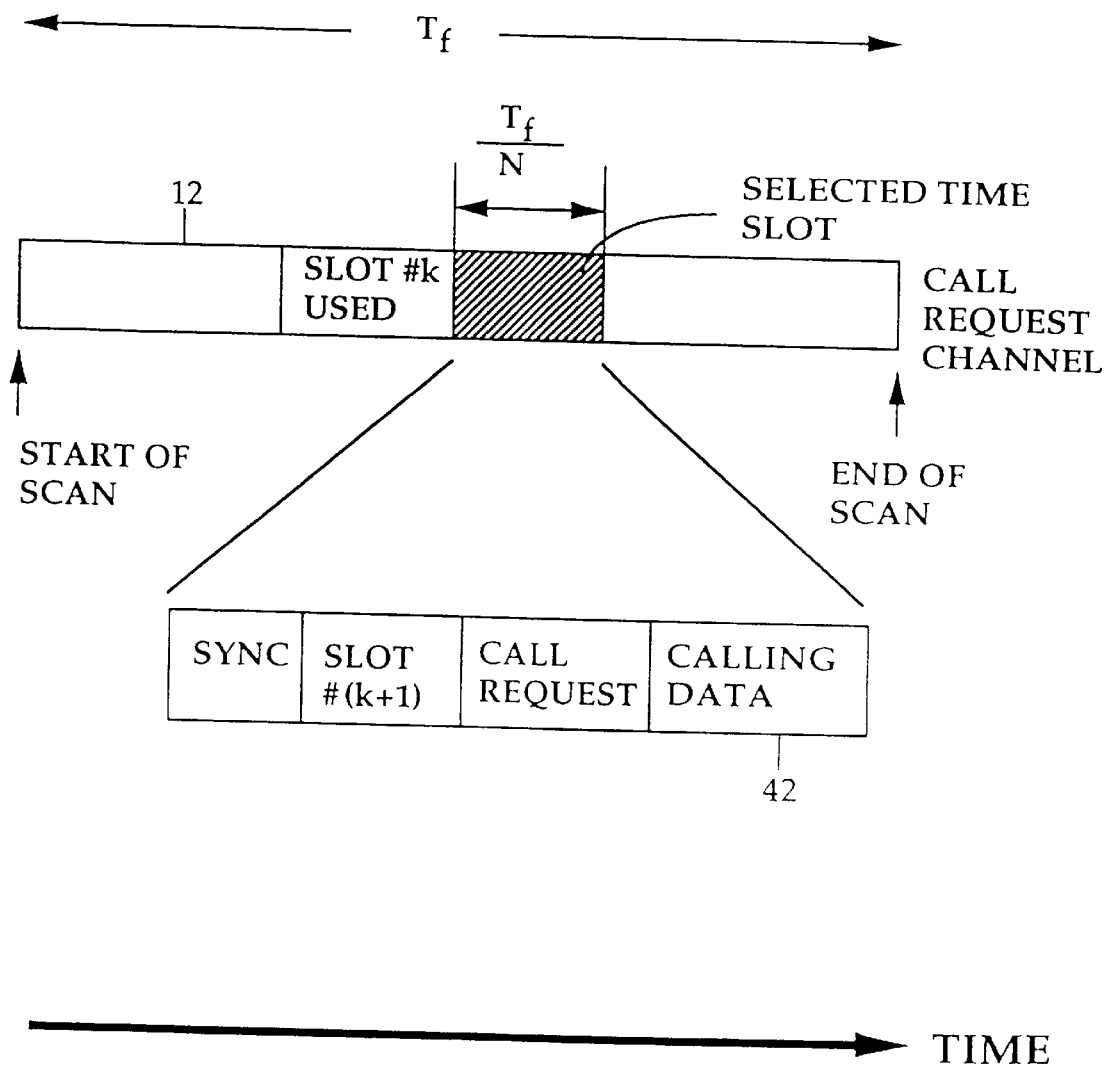
FIG. 8 shows the selected time slot of the wireless terminal on the Call Request channel when the channel is found to have one used slot with at least $T_f/N$ seconds between the end of the slot and the end of the scan.

The wireless terminal 20 uses the right adjacent idle slot, as shown in FIG. 8.

Figure 9:
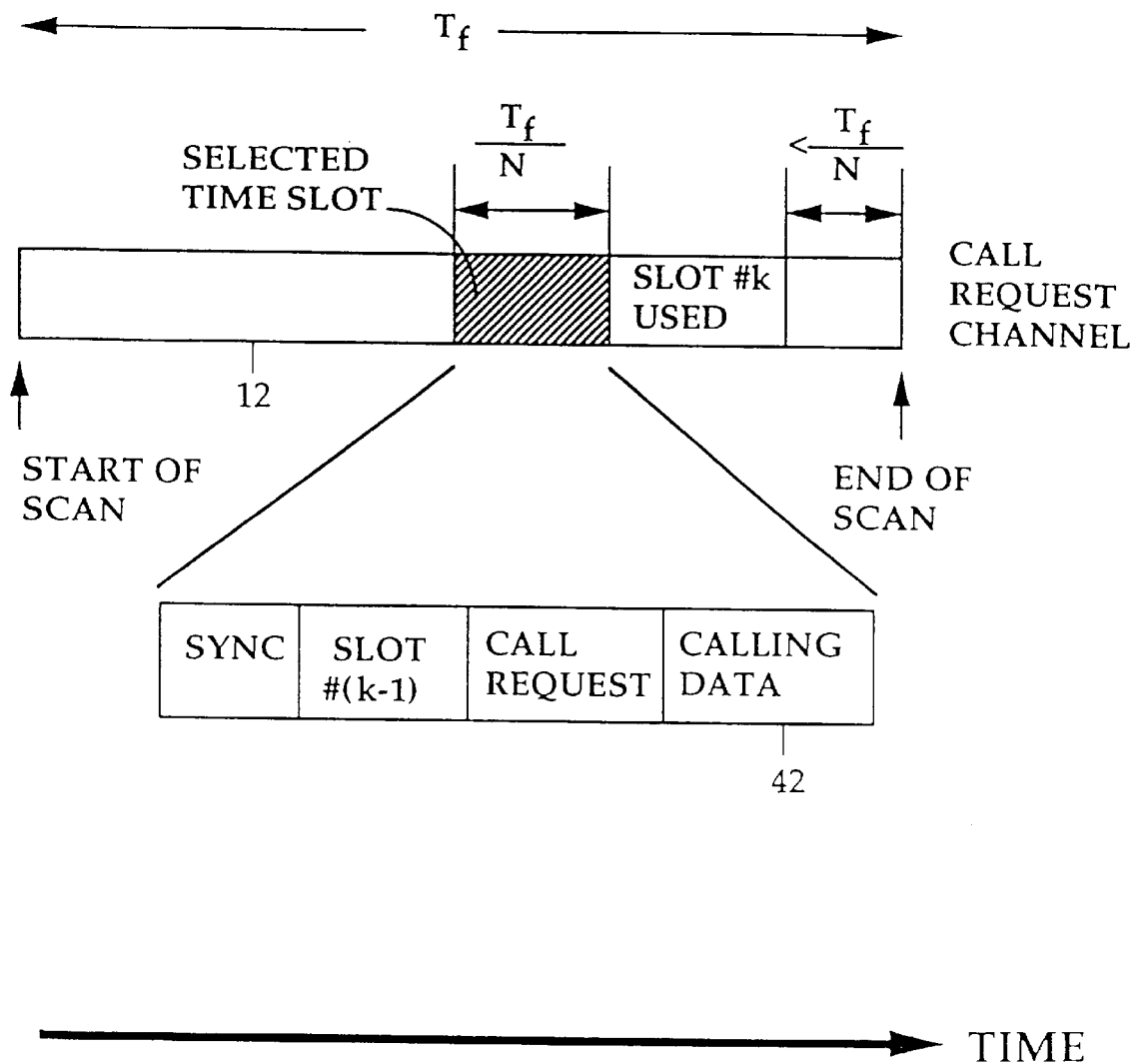
FIG. 9 shows the selected time slot of the wireless terminal on the Call Request channel when the channel is found to have one used slot with less than $T_f/N$ seconds between the end of the slot and the end of the scan.

(2.2.2) The used slot has less than $T_f/N$ seconds between the end of the slot and the end of the scan. The wireless terminal 20 uses the left adjacent idle slot, as shown in FIG. 9.

Figure 10:
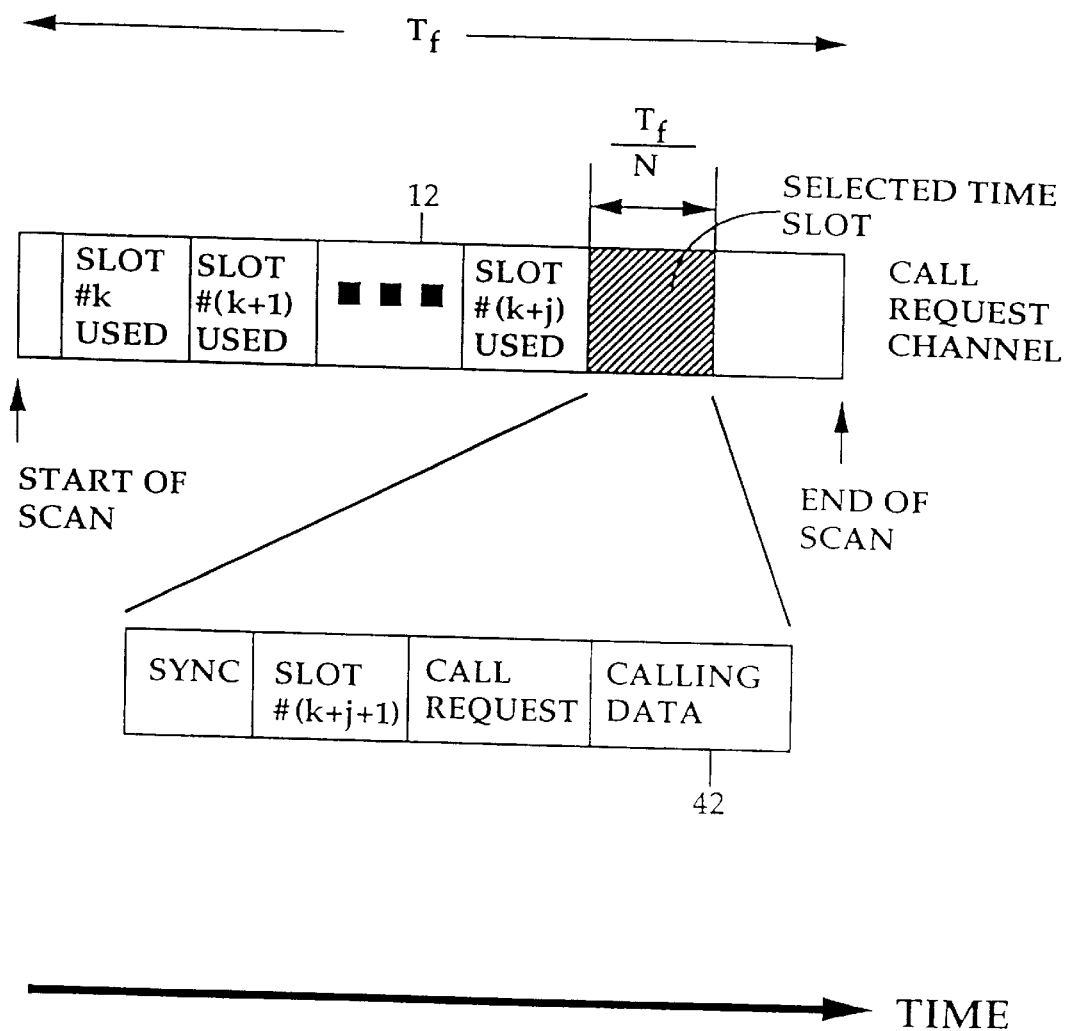
FIG. 10 shows the selected time slot of the wireless terminal on the Call Request channel when the channel is found to have more than one used slot with at least one idle slot available between slot #(k+j) and the end of the scan.

(2.3) The channel has more than one slot that is not idle. The wireless terminal 20 tries to find an idle slot (with $T_f/N$ seconds duration) right adjacent to the first busy slot with slot ID#k. Two different cases follow:

(2.3.1) If no idle slot exists, the wireless terminal 20 has to move to the next non-idle slot until an idle slot (with $T_f/N$ seconds duration) right adjacent to the busy slot with slot ID#(k+j) is found, and then it has to use slot ID#(k+j+1), as shown in FIG. 10.

Figure 11:
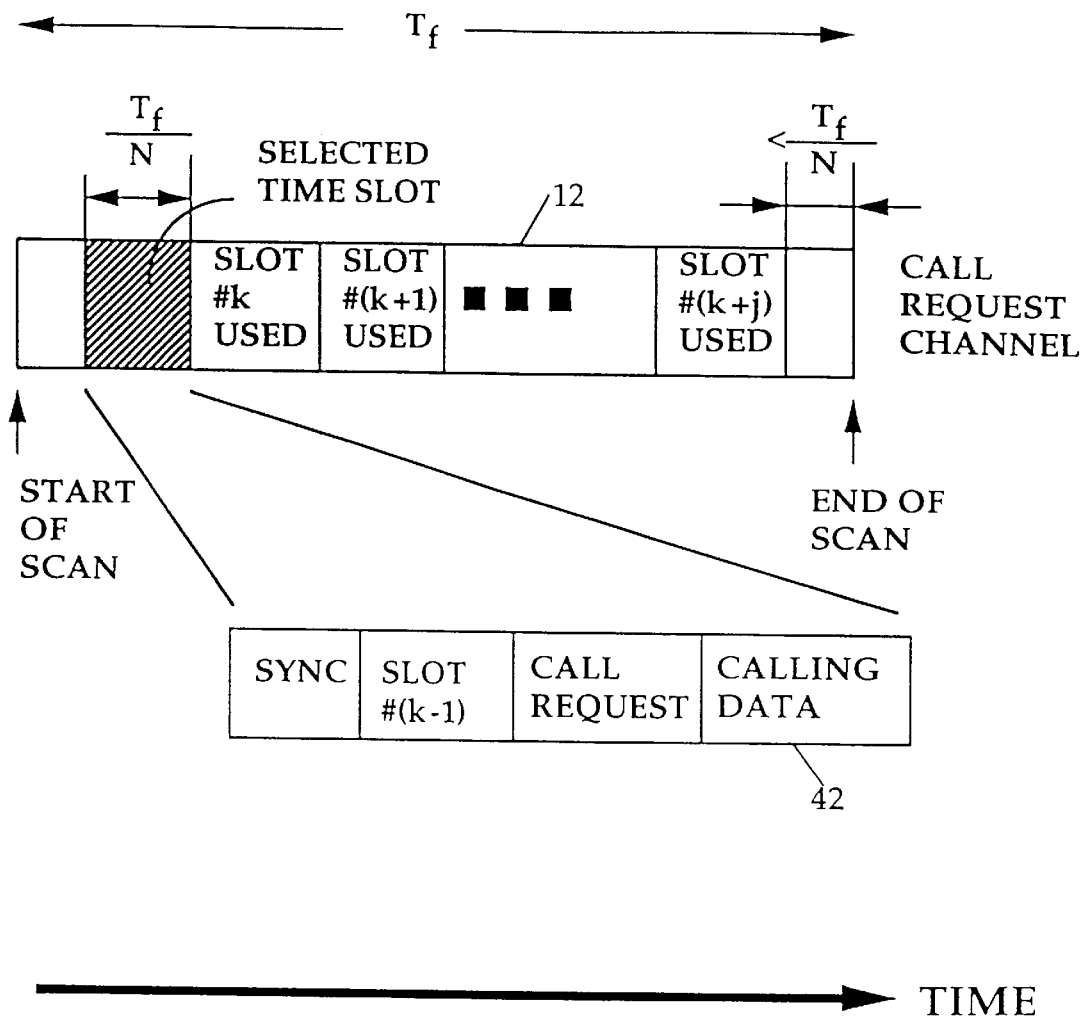
FIG. 11 shows the selected time slot of the wireless terminal on the Call Request channel when the channel is found to have more than one used slot with no idle slot available between slot #k and the end of the scan.

(2.3.2) If no idle slot exists, the wireless terminal 20 has to move to the next non-idle slot until an idle slot (with $T_f/N$ seconds duration) right adjacent to the busy slot is found. If the search fails and if there is an idle slot (with $T_f/N$ seconds duration) from the start of the scan to the beginning of the slot ID#k, then the wireless terminal 20 has to use the idle slot left adjacent to the first busy slot (slot ID #k), and then it has to use slot ID#(k−1), as shown in FIG. 11. Otherwise, the wireless terminal 20 has to generate a busy tone to the user or repeat the scanning process for an idle time slot.

Generally, if one or more but not all time slots are busy, the controller 21 searches for a usable time slot adjacent to a busy time slot and then transmits signals in the usable time slot.

(3) The wireless terminal 20 has to switch to the Call Acknowledge channel 13 and wait for the call acknowledgment packet 50 from the destination (called user). Two cases will follow:

(3.1) The call acknowledgment packet 50 is received. The wireless terminal 20 stops transmitting the call request packet 42 and starts transmitting the call busy packet 44 on the Call Request channel 12 at the same time slot. The call busy packet 44 is used for synchronization of the user-pair. The corresponding hopping pattern is used for the user-pair communication.

(3.2) The call acknowledgment packet 50 is not received. The wireless terminal 20 generates a busy tone to the user.

Message channel

The message channel 11 has N message slots with each slot having a distinct hopping pattern assigned to it. If the system uses digital modulation, then each hopping pattern consists of N distinct frequencies per cycle. If the system uses analog modulation, then each hopping pattern consists of N distinct frequency-pairs per cycle. The same N hopping patterns are used in both analog and digital modulation schemes.

The N hopping patterns are chosen with no co-channel interference. This implies that at any given time, only one hopping pattern occupies a particular frequency slot. The hopping patterns are also chosen with minimum adjacent channel interference. Adjacent channel is defined as the next adjacent frequencies. For example, frequency '4' will have adjacent frequencies '3' and '5'; frequency '1' will have adjacent frequency '2' only. Minimizing the adjacent channel interference implies that:

(a) the occurrence of the next adjacent channels of a particular hopping sequence from the other hopping sequences is ideally nil.

(b) when the adjacent channel interference of a particular hopping sequence is unavoidable from the other hopping sequences, it should be evenly spread among the interfering hopping sequences.

Condition (a) takes precedent over condition (b). In other words, when the wireless terminal 20 starts searching for the hopping sequences, the first goal is to ensure no adjacent channel interference among the hopping sequences until it is unavoidable. Condition (b) implies that the next adjacent channels of a particular hopping sequence should be as evenly distributed as possible among the interfering hopping sequences. For example, if the number of next adjacent channels of a particular hopping sequence=A and the number of interfering hopping sequences=N, then each one of the interfering hopping sequences should contain [A/N] or [A/N]+1 next adjacent channels of the particular hopping sequence where [x]=the largest integer value in x.

The procedure to search for a set of frequency hopping sequences with no co-channel interference and minimum adjacent channel interference is listed below.

(1) Create a sequence file with an arbitrary sequence For example, use the sequence $\{1\ 2\ 3\ 4\ \ldots\ n-1\ n\}$.

(2) Search for the next sequence such that:

(2.1) it is not the same as any sequence in the sequence file, (2.2) it does not have the same channel number during the same dwell period with any sequence in the sequence file, (2.3) the next adjacent channel occurrences during the same dwell period with any sequence in the sequence file is minimum, and (2.4) the next adjacent channel occurrences should be as evenly distributed as possible among the 'interfering' sequences.

(3) Once the search is done, append the new sequence in the sequence file and goto (2) until N sequences are obtained.

Figure 12:
FIG. 12 shows the hopping patterns when N=8.

Using the above procedure, the hopping patterns found have the following properties:

(a) the first N/2 hopping patterns as well as the last N/2 hopping patterns will have no adjacent channel interference (b) the next adjacent channels for each of the first N/2 hopping patterns are evenly distributed among the last N/2 hopping patterns, and vice versa. An example of such hopping patterns is shown in FIG. 12 for N=8.

The preferred set of N frequency hopping patterns is thus characterized by being selected from the group consisting of:

(A) the set A of N frequency hopping patterns defined by:

| column | #1 | #2 | #3 | #4 | #5 | #6 | #7 | #8 | #(N-3) | #(N-2) | #(N-1) | #N |
|---|---|---|---|---|---|---|---|---|---|---|---|---|
| pattern #1 | [1 | 2 | 3 | 4 | 5 | 6 . . . | | | N-3 | N-2 | N-1 | N] |
| pattern #2 | [3 | 4 | 5 | 6 | 7 | 8 . . . | | | N-1 | N | 1 | 2] |
| pattern #3 | [5 | 6 | 7 | 8 | 9 | 10 . . . | | | 1 | 2 | 3 | 4] |

-continued

| column | #1 | #2 | #3 | #4 | #5 | #6 | #7 | #8 | | #(N-3) | #(N-2) | #(N-1) | #N |
|---|---|---|---|---|---|---|---|---|---|---|---|---|---|
| pattern #N/2 | [N-1 | N | 1 | 2 | 3 | 4 . . . | | | | N-5 | N-4 | N-3 | N-2] |
| pattern #(N/2 + 1) | [2 | 3 | N | 1 | N-2 | N-1 | N-4 | N-3 . . . | | | | 4 | 5] |
| pattern #(N/2 + 2) | [4 | 5 | 2 | 3 | N | 1 | N-2 | N-1 . . . | | | | 6 | 7] |
| pattern #(N/2 + 3) | [6 | 7 | 4 | 5 | 2 | 3 | N | 1 . . . | | | | 8 | 9] |
| pattern #N | [N | 1 | N-2 | N-1 | N-4 | N-3 | N-6 | N-5 . . . | | | | 2 | 3]; | and (B) any set of N frequency hopping patterns consisting of any combination of the columns of the frequency hopping pattern defined in set A.

Communication of a user-pair

If analog modulation is used, the system uses frequency division duplex for the communication of a transmitter-receiver pair (user-pair). The frequency-pairs of a particular hopping pattern are used for transmitting and receiving message information between two wireless terminals. If digital modulation is used, the system can use either frequency division duplex or time division duplex for message information exchange between two wireless terminals. If time division duplex scheme is used, transmitting and receiving message information between two wireless terminals is done in alternate times of each frequency of a particular hopping pattern.

Synchronization of a User-pair

Figure 13:
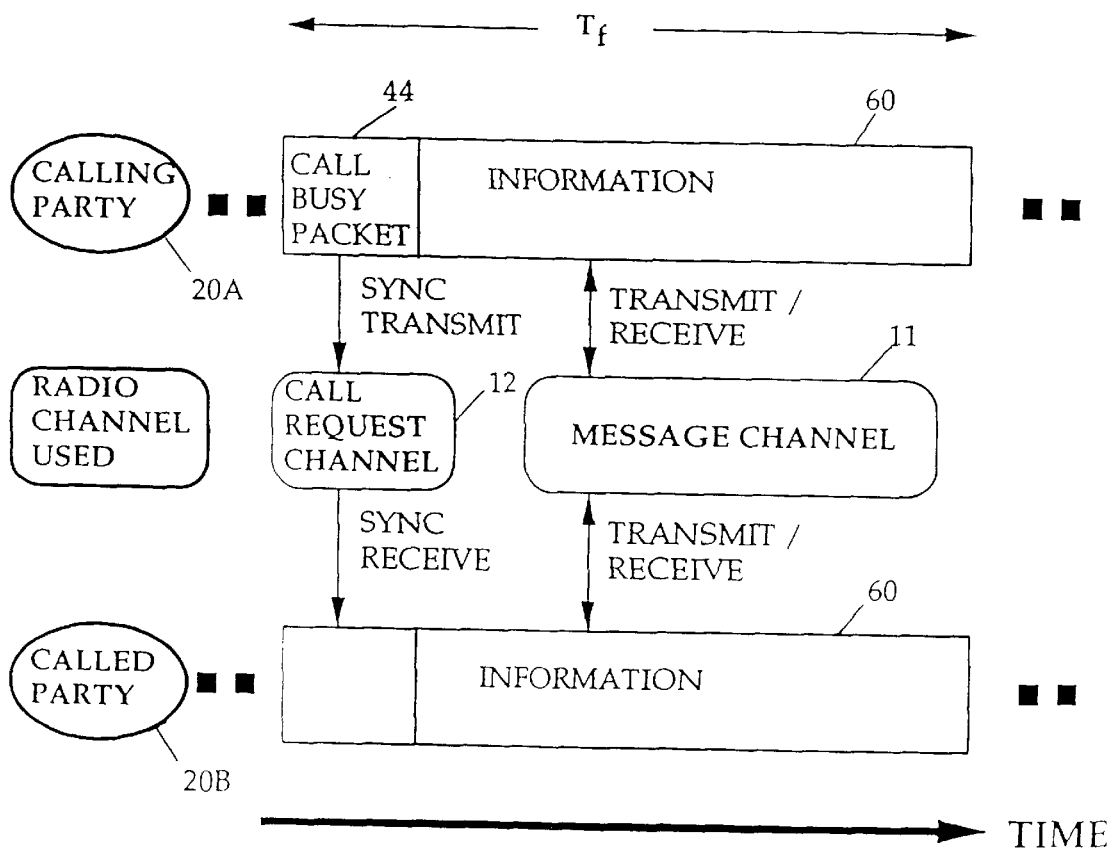
FIG. 13 shows the synchronization between two wireless terminals with one being the calling party and the other being the called party.

The synchronization of a user-pair (transmitter-receiver) is achieved as follows: the wireless terminal 20A which initiates the call provides the master clock for the called party 20B (terminal). The wireless terminal 20A which provides the master clock transmits synchronization information in the call busy packet 44 on the Call Request channel 12 every $T_f$ seconds, as shown in FIG. 13. Between transmission of the call busy packets 44, the calling party 20A and called party 20B exchange message information 60 in the message channel 11.

Synchronization among User-pairs

Synchronization among the user-pairs is achieved in two ways:

(1) If each wireless terminal has a stable internal clock with offset of at most $1 \times 10^{-7}$, then synchronization among the user-pairs is not required.

(2) The wireless terminal 20 which transmits the call busy packet (providing master clock for the called terminal) is responsible for the synchronization with the other user-pairs. Just before transmitting the call busy packet 44 on the Call Request channel 12, the wireless terminal 20 first listens for $T_f/N$ seconds to determine if the adjacent slot is occupied. If so, it obtains the adjacent time slot synchronization information. The terminal 20 then uses this information to adjust its own clock. In this case, each wireless terminal 20 is essentially tracking the adjacent time slot position and trying to synchronize with that user-pair. If the adjacent time slot is unoccupied, it uses its own internal clock.

If the hopping rate=$b/(T_f/N)$ hops/second where b=integer, then synchronization of the hopping patterns among the user-pairs is not required.

A person skilled in the art could make immaterial modifications to the invention described in this patent document without departing from the essence of the invention that is intended to be covered by the scope of the claims that follow.

We claim:

1. A method of radio communication between at least two wireless terminals over an allocated frequency band, in which the allocated frequency band is divided into a signalling channel and a message channel, the message channel is divided into frequency slots and the signalling channel is divided into time slots, the method comprising the steps of:

initiating a call by a wireless terminal accessing an idle time slot in the signalling channel;

the wireless terminal subsequently transmitting message data in the message channel using a distinct frequency hopping pattern corresponding to the time slot accessed by the wireless terminal;

the allocated frequency band having N frequency slots in the message channel and a set of N frequency hopping patterns being available for use by the terminal pairs, the set of N frequency hopping patterns being characterized by being selected from the group consisting of:

(A) the set A of N frequency hopping patterns defined by:

| column | #1 | #2 | #3 | #4 | #5 | #6 | #7 |
|---|---|---|---|---|---|---|---|
| pattern #1 | [1 | 2 | 3 | 4 | 5 | 6 . . . | |
| pattern #2 | [3 | 4 | 5 | 6 | 7 | 8 . . . | |
| pattern #3 | [5 | 6 | 7 | 8 | 9 | 10 . . . | |
| pattern #N/2 | [N-1 | N | 1 | 2 | 3 | 4 . . . | |
| pattern #(N/2+1) | [2 | 3 | N | 1 | N-2 | N-1 | N-4 |
| pattern #(N/2+2) | [4 | 5 | 2 | 3 | N | 1 | N-2 |
| pattern #(N/2+3) | [6 | 7 | 4 | 5 | 2 | 3 | N |
| pattern #N | [N | 1 | N-2 | N-1 | N-4 | N-3 | N-6 |

| column | #8 | #(N-3) | #(N-2) | #(N-1) | #N |
|---|---|---|---|---|---|
| pattern #1 | | N-3 | N-2 | N-1 | N] |
| pattern #2 | | N-1 | N | 1 | 2] |
| pattern #3 | | 1 | 2 | 3 | 4] |
| pattern #N/2 | | N-5 | N-4 | N-3 | N-2] |
| pattern #(N/2+1) | N-3 . . . | | | 4 | 5] |
| pattern #(N/2+2) | N-1 . . . | | | 6 | 7] |
| pattern #(N/2+3) | 1 . . . | | | 8 | 9] |
| pattern #N | N-5 . . . | | | 2 | 3]; | and (B) any set of N frequency hopping patterns consisting of any combination of the columns of the frequency hopping pattern defined in set A.

2. A method of radio communication between at least two wireless terminals over an allocated frequency band, in which the allocated frequency band is divided into a signalling channel and a message channel, the method comprising the steps of:

exchanging message data between the wireless terminals by transmitting and receiving message data over the message channel;

each wireless terminal periodically hopping into the signalling channel during transmission of message data to synchronize the wireless terminals to each other;

the message channel being divided into frequency slots and during transmission of message data each wireless terminal periodically hops in the message channel frequency slots;

the allocated frequency band having N frequency slots in the message channel and a set of N frequency hopping patterns being available for use by the terminal pairs, the set of N frequency hopping patterns being characterized by being selected from the group consisting of:

(A) the set A of N frequency hopping patterns defined by:

| column        | #1    | #2  | #3  | #4  | #5  | #6   | #7   |
|---------------|-------|-----|-----|-----|-----|------|------|
| pattern #1    | [1    | 2   | 3   | 4   | 5   | 6... |      |
| pattern #2    | [3    | 4   | 5   | 6   | 7   | 8... |      |
| pattern #3    | [5    | 6   | 7   | 8   | 9   | 10...|      |
| .             | .     | .   | .   | .   |     |      |      |
| .             | .     | .   | .   | .   |     |      |      |
| pattern #N/2  | [N-1  | N   | 1   | 2   | 3   | 4... |      |
| pattern #(N/2+1) | [2 | 3   | N   | 1   | N-2 | N-1  | N-4  |
| pattern #(N/2+2) | [4 | 5   | 2   | 3   | N   | 1    | N-2  |
| pattern #(N/2+3) | [6 | 7   | 4   | 5   | 2   | 3    | N    |
| .             |       | .   | .   | .   |     |      |      |
| .             |       | .   | .   | .   |     |      |      |
| pattern #N    | [N    | 1   | N-2 | N-1 | N-4 | N-3  | N-6  |

| column        | #8    | #(N-3) | #(N-2) | #(N-1) | #N   |
|---------------|-------|--------|--------|--------|------|
| pattern #1    |       | N-3    | N-2    | N-1    | N]   |
| pattern #2    |       | N-1    | N      | 1      | 2]   |
| pattern #3    |       | 1      | 2      | 3      | 4]   |
| .             | .     | .      | .      | .      | .    |
| .             | .     | .      | .      | .      | .    |
| pattern #N/2  |       | N-5    | N-4    | N-3    | N-2] |
| pattern #(N/2+1) | N-3... |   |        | 4      | 5]   |
| pattern #(N/2+2) | N-1... |   |        | 6      | 7]   |
| pattern #(N/2+3) | 1...   |   |        | 8      | 9]   |
| .             | .     | .      | .      | .      | .    |
| .             | .     | .      | .      | .      | .    |
| pattern #N    | N-5...|        |        | 2      | 3];  | and (B) any set of N frequency hopping patterns consisting of any combination of the columns of the frequency hopping pattern defined in set A.

3. The method of claim 2 in which the signalling channel is divided into time slots, and the method further comprises the steps of:

a wireless terminal initiating a call by accessing an idle time slot in the signalling channel; and the wireless terminal subsequently transmitting message data using a distinct frequency hopping pattern corresponding to the time slot accessed by the wireless terminal.

4. The method of claim 2 in which the signalling channel is divided into time slots and the method further comprising the step of:

accessing the signalling channel by each wireless terminal initially scanning the signalling channel to search for an idle time slot and:

(a) if all time slots are idle, subsequently transmitting signals in any usable time slot;

(b) if one or more but not all time slots are busy, searching for a usable time slot adjacent to a busy time slot and subsequently transmitting signals in the usable time slot; and (c) if all time slots are busy, transmitting a busy tone to the wireless terminal or repeating the scan for an idle time slot.

5. A method of radio communication between at least two wireless terminals over an allocated frequency band, in which the allocated frequency band is divided into at least a signalling channel and a message channel, the message channel being divided into N frequency slots, the method comprising the steps of:

assigning to each wireless terminal a frequency hopping pattern selected from a set of N frequency hopping patterns that are available for use by the wireless terminals;

the wireless terminal subsequently transmitting message data using the frequency hopping pattern; and the set of N frequency hopping patterns being characterized by being selected from the group consisting of:

(A) the set A of N frequency hopping patterns defined by:

| column           | #1   | #2 | #3  | #4  | #5  | #6   | #7  | #8     | #(N-3) | #(N-2) | #(N-1) | #N   |
|------------------|------|----|-----|-----|-----|------|-----|--------|--------|--------|--------|------|
| pattern #1       | [1   | 2  | 3   | 4   | 5   | 6... |     |        | N-3    | N-2    | N-1    | N]   |
| pattern #2       | [3   | 4  | 5   | 6   | 7   | 8... |     |        | N-1    | N      | 1      | 2]   |
| pattern #3       | [5   | 6  | 7   | 8   | 9   | 10...|     |        | 1      | 2      | 3      | 4]   |
| .                |      |    |     | .   | .   | .    |     |        |        |        |        |      |
| .                |      |    |     | .   | .   | .    |     |        |        |        |        |      |
| pattern #N/2     | [N-1 | N  | 1   | 2   | 3   | 4... |     |        | N-5    | N-4    | N-3    | N-2] |
| pattern #(N/2 + 1) | [2 | 3  | N   | 1   | N-2 | N-1  | N-4 | N-3... |        |        | 4      | 5]   |
| pattern #(N/2 + 2) | [4 | 5  | 2   | 3   | N   | 1    | N-2 | N-1... |        |        | 6      | 7]   |
| pattern #(N/2 + 3) | [6 | 7  | 4   | 5   | 2   | 3    | N   | 1...   |        |        | 8      | 9]   |
| .                |      |    |     | .   | .   | .    |     |        |        |        |        |      |
| .                |      |    |     | .   | .   | .    |     |        |        |        |        |      |
| pattern #N       | [N   | 1  | N-2 | N-1 | N-4 | N-3  | N-6 | N-5... |        |        | 2      | 3];  | and (B) any set of N frequency hopping patterns consisting of any combination of the columns of the frequency hopping pattern defined in set A.

6. The method of claim 5 in which the signalling channel is divided into at least N time slots and each time slot is associated with a distinct frequency hopping pattern, the method further comprising the steps of:

assigning the frequency hopping pattern associated with a time slot to a wireless terminal when the wireless terminal accesses that time slot for signalling.

7. A method of radio communication between at least two wireless terminals over an allocated frequency band, in which the allocated frequency band is divided into a signalling channel and a message channel, the signalling channel being divided into time slots, the method comprising the steps of:

exchanging message data between the wireless terminals by transmitting and receiving message data over the message channel; and accessing the signalling channel by each wireless terminal initially scanning the signalling channel to search for an idle time slot and:
  (a) if all time slots are idle, subsequently transmitting signals in any usable time slot;
  (b) if one or more but not all time slots are busy, searching for a usable time slot adjacent to a busy time slot and subsequently transmitting signals in the usable time slot; and
  (c) if all time slots are busy, transmitting a busy tone to the wireless terminal or repeating the scan for an idle time slot.

8. A wireless terminal, comprising:

a radio transceiver;

a frequency synthesizer having output operatively coupled to the radio transceiver, the output of the frequency synthesizer including a signalling channel and a message channel;

a synchronizer operatively coupled to the radio transceiver for the exchange of synchronization information;

a codec operatively coupled to the radio transceiver for the exchange, coding and decoding of message information between a source of message information and the radio transceiver; and a controller operatively coupled to the synchronizer and the frequency synthesizer for instructing the frequency synthesizer to periodically hop into the signalling channel during exchange of message information on the message channel and the synchronizer to provide synchronization information to the radio transceiver during a hop by the frequency synthesizer into the signalling channel.

9. The wireless terminal of claim 8 in which:

the controller has a memory, the message channel includes N frequency slots and the memory stores a set of N frequency hopping patterns, the set of N frequency hopping patterns being characterized by being selected from the group consisting of:

(A) the set A of N frequency hopping patterns defined by:

| column | #1 | #2 | #3 | #4 | #5 | #6 | #7 | #8 | #(N-3) | #(N-2) | #(N-1) | #N |
|---|---|---|---|---|---|---|---|---|---|---|---|---|
| pattern #1 | [1 | 2 | 3 | 4 | 5 | 6 . . . | | | N-3 | N-2 | N-1 | N] |
| pattern #2 | [3 | 4 | 5 | 6 | 7 | 8 . . . | | | N-1 | N | 1 | 2] |
| pattern #3 | [5 | 6 | 7 | 8 | 9 | 10 . . . | | | 1 | 2 | 3 | 4] |
| . | | | | | | | | | | | | |
| . | | | | | | | | | | | | |
| . | | | | | | | | | | | | |
| pattern #N/2 | [N-1 | N | 1 | 2 | 3 | 4 . . . | | | N-5 | N-4 | N-3 | N-2] |
| pattern #(N/2 + 1) | [2 | 3 | N | 1 | N-2 | N-1 | N-4 | N-3 . . . | | | 4 | 5] |
| pattern #(N/2 + 2) | [4 | 5 | 2 | 3 | N | 1 | N-2 | N-1 . . . | | | 6 | 7] |
| pattern #(N/2 + 3) | [6 | 7 | 4 | 5 | 2 | 3 | N | 1 . . . | | | 8 | 9] |
| . | | | | | | | | | | | | |
| . | | | | | | | | | | | | |
| . | | | | | | | | | | | | |
| pattern #N | [N | 1 | N-2 | N-1 | N-4 | N-3 | N-6 | N-5 . . . | | | 2 | 3]; | and (B) any set of N frequency hopping patterns consisting of any combination of the columns of the frequency hopping pattern defined in set A.

10. A wireless terminal, comprising:

a radio transceiver;

a frequency synthesizer having output operatively coupled to the radio transceiver, the output of the frequency synthesizer including a signalling channel and a message channel, the signalling channel being divided into time slots;

a synchronizer operatively coupled to the radio transceiver for the exchange of synchronization information;

a codec operatively coupled to the radio transceiver for the exchange, coding and decoding of message information between a source of message information and the radio transceiver; and a controller operatively coupled to the synchronizer and the frequency synthesizer for instructing the frequency synthesizer to periodically hop in the message channel according to a stored frequency hopping pattern uniquely corresponding to one of the time slots in the signalling channel.

11. The wireless terminal of claim 10 in which:

the controller has a memory, the message channel includes N frequency slots and the memory stores a set of N frequency hopping patterns, the set of N frequency hopping patterns being characterized by being selected from the group consisting of:

(A) the set A of N frequency hopping patterns defined by:

| column | #1 | #2 | #3 | #4 | #5 | #6 | #7 | #8 | #(N-3) | #(N-2) | #(N-1) | #N |
|---|---|---|---|---|---|---|---|---|---|---|---|---|
| pattern #1 | [1 | 2 | 3 | 4 | 5 | 6... | | | N-3 | N-2 | N-1 | N] |
| pattern #2 | [3 | 4 | 5 | 6 | 7 | 8... | | | N-1 | N | 1 | 2] |
| pattern #3 | [5 | 6 | 7 | 8 | 9 | 10... | | | 1 | 2 | 3 | 4] |
| | . | | | . | . | . | | | | | | |
| | . | | | . | . | . | | | | | | |
| | . | | | . | . | . | | | | | | |
| pattern #N/2 | [N-1 | N | 1 | 2 | 3 | 4... | | | N-5 | N-4 | N-3 | N-2] |
| pattern #(N/2 + 1) | [2 | 3 | N | 1 | N-2 | N-1 | N-4 | N-3... | | | 4 | 5] |
| pattern #(N/2 + 2) | [4 | 5 | 2 | 3 | N | 1 | N-2 | N-1... | | | 6 | 7] |
| pattern #(N/2 + 3) | [6 | 7 | 4 | 5 | 2 | 3 | N | 1... | | | 8 | 9] |
| | . | | | . | . | . | | | | | | |
| | . | | | . | . | . | | | | | | |
| | . | | | . | . | . | | | | | | |
| pattern #N | [N | 1 | N-2 | N-1 | N-4 | N-3 | N-6 | N-5... | | | 2 | 3]; | and (B) any set of N frequency hopping patterns consisting of any combination of the columns of the frequency hopping pattern defined in set A.

12. A wireless terminal, comprising:

a radio transceiver;

a frequency synthesizer having output operatively coupled to the radio transceiver, the output of the frequency synthesizer including a signalling channel and a message channel, the signalling channel being divided into time slots;

a synchronizer operatively coupled to the radio transceiver for the exchange of synchronization information;

a codec operatively coupled to the radio transceiver for the exchange, coding and decoding of message information between a source of message information and the radio transceiver; and a controller operatively coupled to the synchronizer and the frequency synthesizer for instructing the frequency synthesizer to scan the signalling channel to search for an idle time slot according to a search program, in which the search program contains instructions:

(a) if all time slots are idle, to cause the radio transceiver to transmit signals in any usable time slot;

(b) if one or more but not all time slots are busy, to search for a usable time slot adjacent to a busy time slot and to cause the radio transceiver to transmit signals in the usable time slot; and (c) if all time slots are busy, to cause the wireless terminal to emit a busy tone to the wireless terminal or repeat the scan for an idle time slot.

13. A wireless terminal, comprising:

a radio transceiver;

a frequency synthesizer having output operatively coupled to the radio transceiver, the output of the frequency synthesizer including a signalling channel and a message channel, the signalling channel being divided into time slots and the message channel being divided into frequency slots;

a synchronizer operatively coupled to the radio transceiver for the exchange of synchronization information;

a codec operatively coupled to the radio transceiver for the exchange, coding and decoding of message information between a source of message information and the radio transceiver; and a controller operatively coupled to the synchronizer and the frequency synthesizer for instructing the frequency synthesizer to periodically hop in the message channel according to a stored frequency hopping pattern characterized by being selected from the group consisting of:

(A) the set A of N frequency hopping patterns defined by:

| column | #1 | #2 | #3 | #4 | #5 | #6 | #7 | #8 | #(N-3) | #(N-2) | #(N-1) | #N |
|---|---|---|---|---|---|---|---|---|---|---|---|---|
| pattern #1 | [1 | 2 | 3 | 4 | 5 | 6... | | | N-3 | N-2 | N-1 | N] |
| pattern #2 | [3 | 4 | 5 | 6 | 7 | 8... | | | N-1 | N | 1 | 2] |
| pattern #3 | [5 | 6 | 7 | 8 | 9 | 10... | | | 1 | 2 | 3 | 4] |
| | . | | | . | . | . | | | | | | |
| | . | | | . | . | . | | | | | | |
| | . | | | . | . | . | | | | | | |
| pattern #N/2 | [N-1 | N | 1 | 2 | 3 | 4... | | | N-5 | N-4 | N-3 | N-2] |
| pattern #(N/2 + 1) | [2 | 3 | N | 1 | N-2 | N-1 | N-4 | N-3... | | | 4 | 5] |
| pattern #(N/2 + 2) | [4 | 5 | 2 | 3 | N | 1 | N-2 | N-1... | | | 6 | 7] |
| pattern #(N/2 + 3) | [6 | 7 | 4 | 5 | 2 | 3 | N | 1... | | | 8 | 9] |
| | . | | | . | . | . | | | | | | |
| | . | | | . | . | . | | | | | | |
| | . | | | . | . | . | | | | | | |
| pattern #N | [N | 1 | N-2 | N-1 | N-4 | N-3 | N-6 | N-5... | | | 2 | 3]; | and (B) any set of N frequency hopping patterns consisting of any combination of the columns of the frequency hopping pattern defined in set A.

* * * * *